United States Patent [19]

Merton et al.

[11] 4,430,479

[45] Feb. 7, 1984

[54] HEAT ACTIVATABLE ADHESIVE WITH IMPROVED TEMPERATURE RESISTANCE

[75] Inventors: W. Randolph Merton, Stillwater; Wayne A. Pletcher, Roseville, both of Minn.

[73] Assignee: Minnesota Mining and Manufacturing Company, St. Paul, Minn.

[21] Appl. No.: 330,903

[22] Filed: Dec. 15, 1981

Related U.S. Application Data

[63] Continuation of Ser. No. 247,251, Mar. 25, 1981, abandoned, which is a continuation of Ser. No. 173,178, Aug. 5, 1980, abandoned, which is a continuation-in-part of Ser. No. 78,596, Sep. 14, 1979, abandoned.

[51] Int. Cl.$^3$ .............................................. C08L 75/04
[52] U.S. Cl. ................................. 525/127; 525/176; 525/183; 525/185; 525/187; 525/418; 525/420; 525/438; 525/453
[58] Field of Search ............... 525/127, 176, 183, 185, 525/187, 418, 420, 438, 453

[56] References Cited

U.S. PATENT DOCUMENTS

| | | | |
|---|---|---|---|
| 2,653,880 | 9/1953 | Hendricks et al. | 117/68.5 |
| 2,653,881 | 9/1953 | Vetter | 117/133 |
| 3,639,655 | 2/1972 | Jones | 260/47 C |
| 3,723,568 | 3/1973 | Hoeschele | 260/835 |
| 3,931,077 | 1/1976 | Uckigaki et al. | 260/26 |
| 3,975,457 | 8/1976 | Chang et al. | 260/859 |
| 4,048,253 | 9/1977 | Ooba et al. | 260/858 |
| 4,059,715 | 11/1977 | Pletcher | 428/349 |
| 4,066,600 | 1/1978 | Pletcher et al. | 260/30.6 R |
| 4,116,937 | 9/1978 | Jones et al. | 528/170 |
| 4,122,073 | 10/1978 | Georgoudis | 525/127 |
| 4,124,571 | 11/1978 | Georgoudis | 525/440 |
| 4,137,364 | 1/1979 | Ball et al. | 428/412 |
| 4,144,219 | 3/1979 | Malloy | 260/33.8 |

FOREIGN PATENT DOCUMENTS

2257501 5/1974 Fed. Rep. of Germany.
54-7441 1/1979 Japan.

*Primary Examiner*—Maurice J. Welsh
*Attorney, Agent, or Firm*—Donald M. Sell; James A. Smith; Robert W. Sprague

[57] ABSTRACT

A heat activatable thermoplastic adhesive composition is described which comprises (a) a thermoplastic polymer, (b) an organic polymer having a plurality of functional groups available for crosslinking, and (c) a crosslinking agent capable of reacting with (b). The adhesive compositions exhibit delayed tack and improved temperature resistance.

21 Claims, No Drawings

HEAT ACTIVATABLE ADHESIVE WITH IMPROVED TEMPERATURE RESISTANCE

CROSS-REFERENCE TO RELATED APPLICATION

This is a continuation of application Ser. No. 247,251 filed Mar. 25, 1981, now abandoned, which is a continuation of Ser. No. 173,178 filed Aug. 5, 1980 now abandoned, which is a continuation-in-part application of Ser. No. 078,596 filed Sept. 14, 1979 now abandoned.

BACKGROUND OF THE INVENTION

This invention relates to heat activatable thermoplastic adhesive compositions.

Since most heat activatable thermoplastic adhesives resolidify rapidly upon cooling, the open time (the period after activation of the adhesive during which it remains aggressively tacky and bondable below the activation temperature) is short and bonding operations must be carried out quickly. However, it is often desirable in certain situations to be able to make a bond after the adhesive has cooled, such as where the substrate to be bonded is difficult to align or maneuver into the desired position or where the substrate surfaces are large in area. In these situations, heat activable adhesive compositions which exhibit sustained or delayed tack and which do not develop full adhesive strength immediately upon cooling are particularly suitable.

Various methods of achieving delayed tack are known in the art, including the employment of thermoplastic polymers containing slowly crystallizing segments as described in U.S. Pat. No. 2,653,880 (Hendricks et al.), U.S. Pat. No. 2,653,881 (Vetter) and U.S. Pat. No. 4,059,715 (Pletcher).

In many bonding operations, such as the application of thermal insulation, (e.g., fiberglass) it is necessary to employ adhesive compositions which result in adhesive bonds exhibiting resistance to elevated temperatures. It is known that improved temperature resistance of adhesive compositions can be achieved by the incorporation of crosslinking in the compositions. Particular crosslinking agents known in the art include the polyepoxides and optional epoxy polymerization catalyst described in U.S. Pat. No. 3,723,568 (Hoeschele). Crosslinking in this example is achieved by reactions with available sites in the base polymers.

U.S. Pat. No. 4,137,364 (Ball et al.) teaches crosslinking of an ethylene/vinyl acetate/vinyl alcohol terpolymer using isophthaloyl biscaprolactam or vinyl triethoxy silane. Crosslinking here is achieved before heat reactivation, but a higher level of performance is attained by additional crosslinking induced by a heat cure after application of the adhesive. Another example of thermal crosslinking is the polyamino bis maleimide class of flexible polyimides described in U.S. Pat. No. 4,116,937 (Jones et al.). These compositions can be hot melt extruded up to 300° F. and undergo crosslinking at temperatures above 300° F. In both of these examples of thermal crosslinking, crosslinking is again achieved by reactions of the particular crosslinking agent with available sites of the base polymers.

Crosslinking of the type described above is expected to decrease the tendency of an adhesive composition to exhibit delayed tack. Furthermore, the improvement in adhesive performance (i.e., temperature resistance) brought about by the above type of crosslinking is usually limited by the residual functionality of the base (adhesive) polymer available for crosslinking.

SUMMARY OF THE PRESENT INVENTION

In accordance with this invention there is provided a heat activatable thermoplastic adhesive composition comprising (a) 100 parts by weight of a thermoplastic polymer; (b) about 1 to 100 parts by weight of an organic polymer having a plurality of functional groups available for crosslinking reactions; and (c) a sufficient amount of a crosslinking agent capable of effecting the desired degree of crosslinking of (b).

Preferred compositions of the present invention comprise a thermoplastic segmented copolyester of the type disclosed in U.S. Pat. No. 4,059,715 (Pletcher) as the thermoplastic polymer (a); a hydroxy-substituted organic polymer as the organic polymer (b); and an isocyanate crosslinking agent as the crosslinking agent (c).

It has now been found possible, by controlling the amount and type of crosslinking introduced into heat activatable thermoplastic adhesive compositions, to increase the temperature resistance of the compositions without altering other desirable properties, e.g. the suitable stability, adhesive strength, low temperature required for reactivation and delayed tack exhibited by the compositions. In the preferred compositions, for example, crosslinking is achieved at ambient temperatures through inclusion of a hydroxylated organic polymer having a high level of crosslinkable reactivity and an isocyanate crosslinking agent capable of reacting with both the hydroxylated organic polymer and any available sites (e.g., residual functionality) in the thermoplastic copolyester. The adhesive compositions of this invention remain heat reactivatable and thermoplastic after crosslinking is substantially complete.

The adhesive compositions of the present invention may be preapplied to substrates well in advance (i.e., about 60 days) of the actual bonding operation. The fact that the composition is then simply heat reactivated when it is desired to perform the bonding operation permits bonding at the worksite to be accomplished without the presence of flammable solvents common to solvent-based adhesives or the employment of often inconvenient water-based adhesives.

Regarding the means of application, the adhesive compositions of the present invention may be applied to substrates as solutions in volatile organic solvents by methods common to solvent-based adhesives (i.e., spray coating, knife coating, roll coating, etc.). The adhesive compositions may be conveniently spray applied to substrates as solutions in volatile organic solvents using conventional spray equipment. The result in any case is a non-blocking thermoplastic adhesive layer which dries quickly in air and which can be heat reactivated immediately or after a period of up to 60 days or so.

Since the adhesive compositions of the present invention exhibit delayed tack (for up to 10 minutes), a low temperature of reactivation and suitable high temperature resistance, these adhesives are particularly useful for applying insulative materials such as thermal insulation for furnaces, air conditioners and freezers and sound deadening insulation for automobiles and the like. The adhesive compositions of the present invention are also suitable for bonding operations involving decorative trim, name plates, fabric and the like. Since crosslinking is achieved at ambient temperatures and since adhesive reactivation occurs at low temperatures (i.e., at about 225° F.), these adhesive compositions are particularly suitable for bonding various temperature sensitive materials such as plastics and the like.

DETAILED DESCRIPTION OF THE PRESENT INVENTION

The preferred thermoplastic polymers useful in the adhesive compositions of the present invention include those thermoplastic segmented copolyesters disclosed in U.S. Pat. No. 4,059,715 (Pletcher), incorporated herein by reference. These are solid, non-tacky, strongly cohesive, solvent-free thermoplastic polymers which are themselves not subject to cold flow and are non-blocking below their melting temperatures but which become aggressively tacky and bondable upon being melted. They consist essentially of from about 5 to 75 percent by weight of amorphous ester units and 95 to 25 percent by weight of crystallizable ester units joined through the ester linkages. The term "crystallizable" as used herein includes both crystalline ester units and units which are capable of becoming crystalline. The crystallizable ester units in the copolyesters are of the formula:

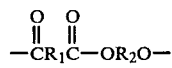

and the amorphous ester units are of the formula:

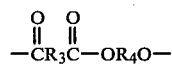

wherein $R_1$ consists of residues (remaining after removal of the carboxyl groups) of one or more diacids selected from saturated aliphatic dicarboxylic acids containing from 4 to about 10 carbon atoms (the residues thereof containing from 2 to 8 carbon atoms) and aromatic dicarboxylic acids selected from terephthalic acid, isophthalic acid, phthalic acid, 4,4'-benzophenone dicarboxylic acid, 4,4'-diphenylmethanedicarboxylic acid, 4,4'-diphenylether dicarboxylic acid, 4,4'-diphenylthioether dicarboxylic acid and 4,4'-diphenylamine dicarboxylic acid, $R_2$ consists of residues (remaining after removal of the hydroxyl groups) of one or more saturated aliphatic diols containing from 2 to 12 carbon atoms, $R_3$ is $R_1$ or $R_5$, $R_4$ is $R_2$ or $R_6$, $R_5$ consists of the divalent radicals containing from 22 to 50 carbon atoms which remain after removal of the carboxyl groups from saturated aliphatic dimer acids (i.e. the polymerized and hydrogenated product of two molecules of an ethylenically unsaturated fatty acid containing from about 12 to 26 carbon atoms, the dimer acid thus being saturated and containing from 24 to 52 carbon atoms) and $R_6$ consists of the divalent radicals remaining after removal of the hydroxyl groups from a long chain aliphatic diol having an average molecular weight of 200 to 4000 (preferably 400 to 2000), provided that at least one of $R_3$ and $R_4$ in each amorphous ester unit is $R_5$ or $R_6$ and provided that when $R_1$ is aromatic, $R_2$ contains from 6 to 12 carbon atoms and the amorphous content is 50–75 percent by weight. The copolyesters have DTA melting temperatures of from about 25° to 150° C. (determined as described in U.S. Pat. No. 4,059,715) and inherent viscosities of at least 0.5 dl/g and usually not more than 1.5 dl/g (measured in 0.3 g/dl solutions of polymer in chloroform at 25° C.). The open times of the copolyesters are at least about ¼ minute at 20° C. and ordinarily they are not more than about 1 hour at 20° C. The copolyesters are also substantially completely soluble in toluene at 25° C. in the ratio of about 10 percent by weight of copolyester and 90% by weight of solvent. Preferably the copolyesters have melting points of at least 40° C., i.e., so that they are solids at ordinary temperatures.

Suitable short chain acids, short chain diols and long chain diols useful for preparing the thermoplastic segmented copolyesters include those materials disclosed in U.S. Pat. No. 4,059,715 (Pletcher). One particularly suitable thermoplastic copolyester comprises radicals of adipic acid, a $C_{36}$ dimer acid formed from linoleic acid (available under the trade designation "EMPOL 1010" from Emery Industries), 1,4-cyclohexane dimethanol and a poly(oxytetramethylene) glycol having a molecular weight of 2,000 and a hydroxyl equivalent of approximately 56 (available under the trade designation "Polymeg 2000" from E. I. DuPont Co.)

Other thermoplastic polymers which are useful in the adhesive compositions of the present invention include other thermoplastic polyesters (e.g., that available under the trade designation "5096" from Cooper Polymers, Inc.), thermoplastic polyurethanes (e.g., that available under the trade designation "Q-thane PH 56" from K. J. Quinn Co., Inc.), thermoplastic polyamides (e.g., that available under the trade designation "Coramid 2430" from Cooper Polymers, Inc.), thermoplastic rubbers (e.g., those available under the trade designation "Kraton 1101" and "Kraton 1107" from Shell Chemical Co.) and ethylene vinylacetate (e.g., that available under the trade designation "Elvax 40" from E. I. DuPont De Nemours Co., Inc.).

Adhesive compositions of the present invention comprise about 1 to 100 parts by weight of an organic polymer having a plurality of functional groups available for crosslinking reactions per 100 parts by weight of the thermoplastic polymer. Polymers having functionalities greater than two are desired in the present invention in order to provide for an extensive crosslinking network.

Preferred organic polymers for use in the present invention are hydroxy-substituted organic polymers (i.e., polyalcohols). More particularly, preference is given in the present invention to the hydroxy-substituted polyesters described in U.S. Pat. No. 3,639,655 (Jones), incorporated herein by reference. These hydroxy-substituted polyesters are formed by the reaction of a diepoxide with a dicarboxylic acid.

In accordance with U.S. Pat. No. 3,639,655, diepoxide components useful for making suitable hydroxy-substituted copolyesters have the formula

wherein n is an integer from 1 to 10 and R is a divalent organic radical which is derived from dihydroxy compounds selected from dihydric phenols, alkane diols and polyalkane diols. The diepoxides should be essentially free of substituents, other than hydroxyl radicals and epoxy groups, capable of reacting with its own epoxy groups or carboxyl radicals of the employed dicarboxylic acids. A particularly suitable diepoxide for use in preparing the hydroxy-substituted polyesters of the present invention is the diglycidyl ester of bisphenol A (available commercially under the trade designation "Epon 828" from Shell Oil Co.).

Useful dicarboxylic acid components have the general formula $$R'(COOH)_2$$

wherein R' is a divalent saturated aliphatic radical, a divalent ethylenically unsaturated aliphatic radical. Of the dicarboxylic acids disclosed in the U.S. Pat. No. 3,639,655, a particularly suitable dicarboxylic acid is the $C_{36}$ dimer acid derived from linoleic acid, which has already been discussed.

Other organic polymers which have a plurality of functional groups available for crosslinking reactions and which are useful in the adhesive compositions of the present invention include other polyalcohols such as hydroxylated acrylates (e.g., that available under the trade designation "Hycar 2106X1" from B. F. Goodrich Chemical Co.) and polyamines (e.g., that available under the trade designation "Jeffamine ED 2000" from Jefferson Chemical Co.).

Compositions of the present invention comprise a sufficient amount of a crosslinking agent capable of effecting the desired degree of crosslinking of the organic polymer (and also the thermoplastic polymer if it has functional groups thereon). Preferred crosslinking agents for use in compositions comprising the preferred hydroxy-substituted organic polymer and the preferred thermoplastic segmented copolyester are isocyanate crosslinking agents. The isocyanate should be present in a sufficient amount to provide about 0.5 to 4 equivalents of —NCO functionality, and preferably 1 to 3 equivalents, for each equivalent of —OH functionality contained in the hydroxylated organic polymer and in the thermoplastic segmented copolyester (i.e., as residual functionality in the thermoplastic segmented copolyester).

Suitable isocyanate crosslinking agents include diisocyanates and polyisocyanates disclosed in U.S. Pat. No. 3,723,163 (Schumacher), incorporated herein by reference. Preferred isocyanates for use in the present invention are diisocyanates and polyisocyanates and, in particular, aromatic di- and polyisocyanates.

Particularly suitable isocyanate crosslinking agents which are commercially available include polymethylene polyphenylisocyanate (available under the trade designations "Mondur MRS" from Mobay Chemical Company, and "PAPI" and "PAPI 135" from the Upjohn Co.) and a modified diphenylmethane diisocyanate (avilable under the trade designation "Isonate 143L" from the Upjohn Co.).

The above-mentioned isocyanates are also suitable as crosslinking agents in compositions which comprise the various other types of thermoplastic polymers and organic polymers described herein. The isocyanate should be present in a sufficient amount to provide about 0.5 to 4 equivalents of —NCO functionality for each equivalent of isocyanate-crosslinkable functionality contained in the organic polymer and in the thermoplastic polymer (i.e., as residual functionality in the thermoplastic polymer).

As an alternative to employing the organic polymer (i.e., the polymer having a plurality of functional groups for crosslinking reactions) and the crosslinking agent as distinct components in the adhesive compositions of the present invention, the crosslinking agent may first be pre-reacted with the organic polymer prior to preparation of the adhesive composition. For example, isocyanate-terminated prepolymer composition formed by the reaction of an equivalent excess of an organic diisocyanate or polyisocyanate with an organic polymer having a plurality of hydroxy, thiol or amine groups are useful in the compositions of the present invention. An example of a composition which comprises an isocyanate-functional prepolymer and which is suitable for employment in the compositions of the present invention is "EC 4801" available from 3M.

It is often desirable to include tackifying resins in the compositions of the present invention in order to augment adhesive properties of the compositions. The particular tackifying resin employed should be compatible with other components of the composition. While compositions of the present invention may comprise up to about 100 parts by weight of a suitable tackifying resin per 100 parts by weight of the thermoplastic polymer, preferred compositions comprise about 10 to 50 parts by weight per 100 parts by weight of the thermoplastic polymer.

Examples of suitable tackifying resins are well-known in the art and include those disclosed in U.S. Pat. No. 4,124,571 (Georgoudis), incorporated herein by reference. Particularly suitable resins include both hydrogenated and dehydrogenated rosins and rosin esters such as the methanol, ethylene glycol, di- and triethylene glycols, glycerol, and pentaerythritol esters. Examples of suitable rosins which are commercially available include the glycerol ester of hydrogenated rosin (available under the trade designation "Staybelite Ester 10" from Hercules Chemical Co.), pentaerythritol ester of highly hydrogenated rosin (available under the trade designations "Foral 85" and "Foral 105" from Hercules Chemical Co.), and pentaerythritol ester of rosin (available under the trade designation of "Pentalyn A" from Hercules Chemical Co.). Another particularly suitable tackifying resin is a polyketone resin available under the trade designation "Mohawk 85" from Mohawk Chemicals).

The compositions of the present invention can be modified by the incorporation of fillers, pigments, dyes, antioxidants and other modifiers in order to alter the properties of the compositions. Types and amounts of these materials can easily be determined by those skilled in the art.

The adhesive compositions may be conveniently spray applied as solutions in organic solvents. The particular solvent or solvent blend employed should completely dissolve the adhesive composition in a suitable volume of solvent, should exhibit suitable spray characteristics and should be of sufficient volatility to allow a rapid drying time. Preferred for employment with the preferred compositions of the present invention are solvent blends comprising commonly available ketones such as acetone and methylethyl ketone; halogenated and nonhalogenated hydrocarbons such as hexane, petroleum naphtha, methylene chloride, chlorothene and trichloroethane; and organic esters such as ethyl acetate and methyl acetate. The solvent blend is preferably present in such an amount to give a total solids content of up to about 35% by weight for spray applications. Suitable solvent blends and suitable variations within a given blend appear in Tables 1 and 2.

TABLE I

Examples of solvent blends suitable for dissolving components of thermoplastic adhesive compositions.

| Solvent | Percentage Composition of Blend | | | | |
|---|---|---|---|---|---|
| | 1 | 2 | 3 | 4 | 5 |
| Acetone | — | — | — | — | 30 |
| Methyl Ethyl Ketone | — | — | — | 38 | — |
| Hexane | 20 | 20 | — | — | — |
| Petroleum Naphtha | — | — | — | 34 | 35 |
| Methylene Chloride | 39 | 41 | 28 | 28 | 17.5 |
| Trichloroethane | — | — | 42 | — | 17.5 |
| Ethyl Acetate | 41 | — | 30 | — | — |
| Methyl Acetate | — | 39 | — | — | — |

TABLE 2

Example of suitable variations within a given solvent blend.

| Solvent | Suitable Solvent Compositions (%) |
|---|---|
| Petroleum Naphtha | 12 ⇐⇒ 62 |
| Methyl Ethyl Ketone | 88 ⇐⇒ 0 |
| Methylene Chloride | 88 ⇐⇒ 0 |

When it is desired to apply the adhesive compositions by other methods well-known in the art (i.e., knife coating, roll coating, etc.), organic solutions of the adhesive compositions may have a total solids content of up to about 50% by weight.

In order to assure stability of solutions of the adhesive composition, it may be desirable to add the crosslinking agent to the solutions a short time prior to application of the adhesive.

Once applied to the surface of the substrate to be bonded, the adhesive composition is heated to a temperature at or above its crystalline melt temperature (i.e., DTA melting temperature). The crystalline melt temperature of the adhesive composition is not necessarily the same as the DTA melting temperature of the particular thermoplastic polymer (e.g., thermoplastic segmented copolyester) employed since the other components of the composition may lower and/or broaden the DTA melting temperature of the thermoplastic polymer. After it has been heated, the adhesive composition is then allowed to cool below its crystalline melt temperature and, during its open time, is brought into contact with a second substrate. The adhesive composition and substrates are maintained in contact with one another until the adhesive composition has reverted to a non-tacky state. Due to the delayed tack exhibited by these adhesive compositions, fixturing (i.e., clamping) of the substrates is generally not required.

The following non-limiting examples will illustrate the practice of the invention. Unless otherwise indicated, all parts, proportions and percentages are by weight.

EXAMPLE 1

A thermoplastic segmented copolyester is prepared from 80 equivalents of adipic acid, 20 equivalents of the $C_{36}$ dimer acid of linoleic acid (available from Emery Industries under the trade designation "EMPOL 1010"), 95 equivalents of 1,4-cyclohexane dimethanol (available from Eastman Chemicals under the trade designation "CHDM-R") and 5 equivalents of poly(oxytetramethylene) glycol (2,000 molecular weight, available from E. I. duPont Co. under the trade designation "Polymeg 2000"). The above ingredients, together with about 1 part by weight of the antioxidant "Irganox 1010" (available from Ciba-Geigy), are placed in a 3-neck flask fitted with a mechanical stirrer, a Dean-Starke trap-condenser, a thermometer, and a gas inlet for maintaining an inert atmosphere within the flask. Inert gas is introduced into the flask and the contents of the flask are brought to 170° C. by means of a heated oil bath. The mixture is stirred and held at this temperature for about 3 hours. During this time, water resulting from the condensation is collected in the trap. The temperature of the mixture is reduced to about 145° C., and the pressure is then reduced to 5 to 0.25 mm Hg. These conditions are maintained for about one hour to remove additional volatile material. About 1 part by weight of the catalyst tetrabutyl titanate (available from E. I. duPont Co. under the trade designation "Tyzor TBT") is then added while maintaining an inert atmosphere. The temperature of the mixture is increased to 200° to 220° C. and the pressure reduced to 0.15 mm Hg and these conditions maintained for approximately 4 hours. The polymer solidifies on cooling to a tough flexible colorless, opaque material.

An hydroxy-substituted polyester is prepared from the same $C_{36}$ dimer acid described above and "Epon 828" (available from Shell Oil Co). Accelerator "AMC-2" (available from Cordova Chemicals), 4.9 grams, 1% w/w, was dissolved in 289 grams of "EMPOL 1010" $C_{36}$ dimer acid (available from Emery Industries) and the resulting solution is stirred for 30 minutes at 40° C. After cooling to ambient temperatures, 201 grams "EPON 828" (available from Shell Oil Co) is added with stirring. The mixture is then heated to 95° C. and maintained at that temperature for 4 hours. The resulting hydroxy-substituted polyester, which has a number average molecular weight of about 16,000, a hydroxyl number of 86 and an equivalent weight of 600, is used without further purification.

An adhesive composition of the present invention is then prepared using the following ingredients in the amounts indicated. All ingredients except the isocyanate are combined and, once solution is achieved, the isocyanate is added to the solution.

| | Parts by Weight |
|---|---|
| Segmented copolyester | 100 |
| Hydroxy-substituted polyester | 6 |
| "Mondur MRS" (a polymethylene polyphenylisocyanate, available from Mobay Chemical Co.) | 2.5 |
| "Pentalyn A" (tackifying resin available from Hercules Chemical Co.) | 20 |
| Chlorothene | 90.5 |
| Methylene chloride | 90.5 |
| Petroleum naphtha | 181 |
| Acetone | 154 |

In testing its temperature performance, the above adhesive composition is spray applied to fiberglass insulation (¼-inch thick, 3 pounds per cubic foot; or ⅜-inch thick, ½ pounds per cubic foot) and air-dried. The resulting coated insulation is cut into 2-inch by 8-inch strips. The strips are heat reactivated by explosure to infrared heat lamps (18 watts/inch$^2$) for about 10 seconds, during which the temperature of the adhesive layer rose to between 225° and 250° F. (107.7° and 121.1° C.). The reactivated strips are bonded to the outside bend of an aluminum panel (8×8 inch) which has been bent at an angle of 90°. The test specimens are aged overnight at room temperature and then are placed for 4 hours in an oven which has been preheated to the desired testing temperature. When tested in this manner (designated "Test A"), the adhesive bond resists temperatures up to 275° F. (135° C.), but fails at 300° F. (148.9° C.).

Alternatively, a 6-mil (wet) film of the adhesive composition is cast on aluminum foil and dried. The coated foil is cut into 1-inch wide strips which are then heat reactivated by placing in an oven at 225° F. (107.2° C.) for 3 minutes. A 1-square inch area of the coated foil is bonded to an aluminum panel to form an overlap shear bond. A 1-pound weight is attached to the free end of each of these foil strips and the test panels are placed in an oven which is at 100° F. (38° C.). The temperature of the oven is increased at a rate of 10° F. every 30 minutes until bond failure occurs. When tested in this manner (designated "Test B"), the bond resists temperatures up to 260° F. (126.7° C.).

When the above adhesive composition was airsprayed onto a fiberglass pad (¼-inch thick, 3 pounds per cubic foot) at a coating weight of 1.8 grams/square foot, a non-blocking adhesive layer was obtained which was dry to touch within less than 1 minute. The adhesive layer was heat reactivated using an infrared heat lamp as described above. The reactivated adhesive displayed delayed tack, having a bonding range of greater than 3 minutes.

Crosslinking, as evidenced by infrared spectroscopy, is essentially complete after 2 weeks. The adhesive composition could be spray applied and heat reactivated, without any significant change in temperature resistance or bonding range, at any time during this 2-week period.

EXAMPLE 2

Another useful adhesive composition comprising the following ingredients is prepared in accordance with Example 1:

|  | Parts by Weight |
| --- | --- |
| Segmented copolyester of Example 1 | 113 |
| Hydroxy-substituted Polyester of Example 1 | 6.8 |
| "Mondur MRS" | 5.6 |
| "Pentalyn A" | 22.6 |
| Methylene chloride | 160.3 |
| Petroleum naphtha | 194 |
| Methyl Ethyl Ketone | 215 |

The above adhesive composition is spray applied to 2-inch (5.08 cm) thick, medium density, polyurethane foam and is allowed to dry. After heat reactivation of the adhesive using infrared heat lamps in accordance with Example 1, a 6-inch by 10-inch piece of the coated polyurethane foam is bonded to an aluminum panel. The panel is placed in an oven set at 250° F. (121.1° C.) with the foam suspended horizontally. When tested in this manner, no bond failure was observed within 4 hours.

EXAMPLE 3

Another useful adhesive composition comprising the following ingredients is prepared in accordance with Example 1:

|  | Parts by Weight |
| --- | --- |
| Segmented copolyester of Example 1 | 113 |
| Hydroxy-substituted polyester of Example 1 | 50 |
| "Mondur MRS" | 7.4 |
| "Pentalyn A" | 22.6 |
| Methylene chloride | 209 |
| Petroleum naphtha | 252.6 |
| Methyl ethyl ketone | 280.4 |

When this adhesive composition is tested in accordance with "Test A" of Example 1, the adhesive bond resisted temperatures of 275° F. (135° C.).

EXAMPLE 4

Another useful adhesive composition comprising the following ingredients is prepared in accordance with Example 1:

|  | Parts by Weight |
| --- | --- |
| Segmented copolyester of Example 1 | 113 |
| Hydroxy-substituted polyester of Example 1 | 75 |
| "Mondur MRS" | 8.4 |
| "Pentalyn A" | 22.6 |
| Methylene chloride | 237 |
| Petroleum naphtha | 286 |
| Methyl ethyl ketone | 318.2 |

When this adhesive composition is tested in accordance with "Test A" of Example 1, the adhesive bond resisted temperatures of 275° F. (135° C.).

EXAMPLE 5

Another useful adhesive composition comprising the following ingredients is prepared in accordance with Example 1:

|  | Parts by Weight |
| --- | --- |
| Segmented copolyester of Example 1 | 100 |
| Hydroxy-substituted polyester of Example 1 | 12 |
| "Isonate 143L" (modified diphenylmethane diisocyanate, available from the Upjohn Co). | 5.3 |
| "Pentalyn A" | 20 |
| Methylene chloride | 142 |
| Petroleum naphtha | 172 |
| Methyl ethyl ketone | 192 |

When this adhesive composition is tested in accordance with "Test A" of Example 1, the adhesive bond resisted temperatures of 200° F. (93.3° C.), but fails at 225° F. (107.2° C.).

EXAMPLE 6

By way of comparison an adhesive composition comprising the following ingredients is prepared in accordance with Example 1:

|  | Parts by weight |
| --- | --- |
| Segmented copolyester of Example 1 | 113.1 |
| "Mondur MRS" | 2.8 |
| "Pentalyn A" | 22.6 |
| Methylene chloride | 160.3 |
| Methyl ethyl ketone | 219.6 |

| | Parts by weight |
|---|---|
| Petroleum naptha | 194.1 |

When this adhesive composition is tested in accordance with "Test A" of Example 1, the adhesive bond failed at 225° F. (107.2° C.).

EXAMPLE 7

Also by way of comparison, an adhesive composition comprising the following ingredients is prepared in accordance with Example 1:

| | Parts by Weight |
|---|---|
| Segmented copolyester of Example 1 | 100 |
| "Pentalyn A" | 20 |
| Chlorothene | 90.5 |
| Methylene chloride | 90.5 |
| Petroleum naphtha | 181 |
| Acetone | 154 |

When this adhesive composition is tested in accordance with "Test A" of Example 1, the adhesive bond failed at 180° F. (82.2° C.). When this adhesive composition is tested in accordance with "Test B" of Example 1, the adhesive bond failed at 160° F. (71.1° C.).

EXAMPLE 8

Another useful adhesive composition comprises the following ingredients combined in accordance with the procedure of Example 1:

| | Parts by Weight |
|---|---|
| "Q-thane PH 56" (a thermoplastic polyurethane available from K. J. Ouinn & Co., Inc.) | 100 |
| Hydroxy-substituted polyester of Example 1 | 7.5 |
| "Mondur MRS" | 3 |
| "Mohawk 85" (a polyketone tackifying resin available from Mohawk Chemical) | 25 |
| Methyl ethyl ketone | 500 |

When this adhesive composition is tested in accordance with "Test B" of Example 1, except that here the coated foil is heat reactivated and bonded using a heated press operated at 40 psi at about 300° F. (149° C.) for about 3–5 seconds and a 100-gram weight is used instead of the 1-pound weight, the adhesive bond resists temperatures in excess of 380° F. (193° C.). By way of comparison, an adhesive composition containing all of the above ingredients except the hydroxy-substituted polyester fails at about 330° F. (165° C.) and an adhesive composition containing all of the above ingredients except the hydroxy-substituted polyester and the "Mondur MRS" fails at about 240° F. (116° C.).

EXAMPLE 9

Another useful adhesive composition comprises the following ingredients combined in accordance with the procedure of Example 1:

| | Parts by Weight |
|---|---|
| "Cooper 5096" (a linear polyester available from Cooper Polymers, Inc.) | 100 |
| Hydroxy-substituted polyester of Example 1 | 7.5 |
| "Mondur MRS" | 3 |
| "Pentalyn A" | 25 |
| Methylene chloride | 600 |

When this adhesive composition is tested in accordance with "Test B" of Example 1, but as modified in Example 8, the adhesive bond resists temperatures up to about 370° F. (188° C.). By way of comparison, an adhesive composition containing all of the above ingredients except the hydroxy-substituted polyester fails at about 220° F. (104° C.) and an adhesive composition containing all of the above ingredients except the hydroxy-substituted polyester and the "Mondur MRS" fails at about 180° F. (82° C.).

EXAMPLE 10

Another useful adhesive composition comprises the following ingredients combined in accordance with the procedure of Example 1:

| | Parts by Weight |
|---|---|
| "Coramid 2430" (a polyamide available from Cooper Polymers, Inc.) | 100 |
| Hydroxy-substituted polyester of Example 1 | 7.5 |
| "Mondur MRS" | 3 |
| "Foral 105" (a pentaerythritol ester of highly hydrogenated resin available from Hercules Chemical Co.) | 25 |
| Methylene chloride | 500 |

When this adhesive composition is tested in accordance with "Test B" of Example 1, but as modified in Example 8, the adhesive bond resists temperatures in excess of 380° F. (193° C.). By way of comparison, an adhesive composition containing all of the above ingredients except the hydroxy-substituted polyester fails at about 350° F. (177° C.) and an adhesive composition containing all of the above ingredients except the hydroxy-substituted polyester and the "Mondur MRS" fails at about 240° F. (116° C.).

EXAMPLE 11

Another useful adhesive composition comprises the following ingredients combined in accordance with the procedure of Example 1:

| | Parts by Weight |
|---|---|
| "Kraton 1107" (a thermoplastic rubber available from Shell Chemical Co.) | 50 |
| "Kraton 1101" (a thermoplastic rubber available from Shell Chemical Co.) | 50 |
| Hydroxy-substituted polyester Example 1 | 14 |
| "Mondur MRS" | 6.7 |
| "Foral 105" | 100 |
| "LX 509" (cumaroneindene available from Neville Chemical Co.) | 27 |
| Toluene | 909 |

When this adhesive composition is tested in accordance with "Test B" of Example 1, but as modified in Example 8, the adhesive bond resists temperatures up to about 220° F. (104° C.). By way of comparison, an adhesive composition containing all of the above ingredients except the hydroxy-substituted polyester and the "Mondur MRS" fails at about 190° F. (88° C.).

EXAMPLE 12

Another useful adhesive composition comprises the following ingredients combined in accordance with the procedure of Example 1:

|  | Parts by Weight |
|---|---|
| "Elvax 40" (an ethylene vinyl acetate available from DuPont) | 100 |
| Hydroxy-substituted polyester of Example 1 | 9.6 |
| "Mondur MRS" | 4 |
| "Foral 85" (a pentaerythritol ester of highly hydrogenated rosin available from Hercules Chemical Co.) | 60 |
| Methylene chloride | 640 |

When this adhesive composition is tested in accordance with "Test B" of Example 1, but as modified in Example 8, the adhesive bond resists temperatures up to about 240° F. (116° C.). By way of comparison, an adhesive composition containing all of the above ingredients except the hydroxy-substituted polyester and the "Mondur MRS" fails at about 180° F. (82° C.).

EXAMPLE 13

Another useful adhesive composition comprises the following ingredients combined in accordance with the procedure of Example 1:

|  | Parts by Weight |
|---|---|
| Segmented copolyester of Example 1 | 113 |
| "Hycar 2106X1" (a hydroxylated acrylate available from B. F. Goodrich) | 15.7 |
| "Mondur MRS" | 2.6 |
| "Pentalyn A" | 22.6 |
| Methylene chloride | 160.3 |
| Petroleum naphtha | 194 |
| Methyl ethyl ketone | 215 |

When this adhesive composition is tested in accordance with "Test B" of Example 1, but as modified in Example 8, the adhesive bond resists temperatures in excess of about 300° F. (149° C.). By way of comparison, an adhesive composition containing all of the above ingredients except the "Hycar 2106X1" fails at about 190° F. (88° C.) and an adhesive composition containing all of the above ingredients except the "Hycar 2106X1" and the "Mondur MRS" fails at about 160° F. (71° C.).

EXAMPLE 14

Another useful adhesive composition comprises the following ingredients combined in accordance with the procedure of Example 1:

|  | Parts by Weight |
|---|---|
| Segmented copolyester of Example 1 | 113 |
| "Jeffamine ED 2000" (a polyamine available from Jefferson Chemical Co.) | 14.1 |
| "Mondur MRS" | 2.7 |
| "Pentalyn A" | 22.6 |
| Methylene chloride | 160.3 |
| Petroleum naphtha | 194 |
| Methyl ethyl ketone | 215 |

When this adhesive composition is tested in accordance with "Test B" of Example 1, but as modified in Example 8, the adhesive bond resists temperatures up to about 280° F. (138° C.). By way of comparison, an adhesive composition containing all of the above ingredients except the "ED 2000" fails at about 190° F. (88° C.) and an adhesive containing all of the above ingredients except the "ED 2000" and the "Mondur MRS" fails at about 160° F. (71° C.).

EXAMPLE 15

Another useful adhesive composition comprises the following ingredients combined in accordance with the procedure of Example 1:

|  | Parts by Weight |
|---|---|
| "Q-thane PH56" | 100 |
| "EC 4801" (a composition comprising an isocyanate-functional prepolymer available from 3M) | 20 |
| "Mohawk 85" | 20 |
| Methyl ethyl ketone | 480 |

When this adhesive composition is tested in accordance with "Test B" of Example 1, but as modified in Example 8, the adhesive bond resists temperatures in excess of about 300° F. (149° C.). By way of comparison, an adhesive composition containing all of the above ingredients except the "EC 4801" fails at about 240° F. (116° C.).

What is claimed is:

1. A heat activatable thermoplastic adhesive composition comprising: (a) 100 parts by weight of a thermoplastic polymer; (b) about 1 to 100 parts by weight of an organic polymer having a plurality of functional groups available for crosslinking reactions, said organic polymer being selected from the group consisting of hydroxy-substituted polyesters, hydroxylated acrylates and polyamines; and (c) a sufficient amount of crosslinking agent capable of effecting the desired degree of crosslinking of said organic polymer; said adhesive composition exhibiting delayed tack on heat activation and exhibiting high temperature resistance.

2. A heat activatable thermoplastic adhesive composition in accordance with claim 1, wherein said thermoplastic polymer is selected from the group consisting of polyesters, polyurethanes, polyamides, rubbers and ethylene vinylacetates.

3. A heat activatable thermoplastic adhesive composition in accordance with claim 1, wherein said crosslinking agent is selected from the group consisting of diisocyanates and polyisocyanates.

4. A heat activatable thermoplastic adhesive composition in accordance with claim 1, wherein said first part comprises a tackifying resin.

5. A heat activable thermoplastic adhesive composition comprising: (a) 100 parts by weight of a thermoplastic polymer selected from the group consisting of thermoplastic polyurethanes, thermoplastic polyamides, and ethylene vinylacetates; (b) about 1 to 100 parts by weight of an organic polymer having a plurality of functional groups available for crosslinking reactions; and (c) a sufficient amount of crosslinking agent capable of effecting the desired degree of crosslinking of said organic polymer; said adhesive composition exhibiting delayed tack on heat activation and exhibiting high temperature resistance.

6. A heat activatable thermoplastic adhesive composition in accordance with claim 5, wherein said organic polymer is selected from the group consisting of polyalcohols and polyamines.

7. A heat activatable thermoplastic adhesive composition in accordance with claim 5, wherein said first part comprises a tackifying resin.

8. A heat activatable thermoplastic adhesive composition in accordance with claim 5, wherein said crosslinking agent is selected from the group consisting of diisocyanates and polyisocyanates.

9. A heat activable thermoplastic adhesive composition comprising:
(a) 100 parts by weight of a thermoplastic segmented copolyester consisting essentially of from about 5 to 75 percent by weight of amorphous ester units and 95 to 25 percent by weight of crystallizable ester units joined through ester linkages, the crystallizable ester units being of the formula:

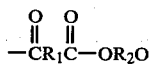

and the amorphous ester units being of the formula:

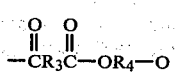

wherein $R_1$ consists of residues of one or more diacids selected from saturated aliphatic dicarboxylic acids containing from 4 to 10 carbon atoms and aromatic dicarboxylic acids selected from terephthalic acid, isophthalic acid, phthalic acid, 4,4'-benzophenone dicarboxylic acid, 4,4'-diphenylmethane dicarboxylic acid, 4,4'-diphenylether dicarboxylic acid, 4,4'-diphenylamine dicarboxylic acid, $R_2$ consists of residues of one or more saturated aliphatic diols containing from 2 to 12 carbon atoms, $R_3$ is $R_1$ or $R_5$, $R_4$ is $R_2$ or $R_6$, $R_5$ consists of the divalent radicals containing from about 22 to 50 carbon atoms which remain after removal of the carboxyl groups from saturated aliphatic dimer acids and $R_6$ consists of the divalent radicals remaining after removal of the hydroxyl groups of long chain aliphatic diols having an average molecular weight of 200 to 4000, provided that at least one of $R_3$ and $R_4$ in each amorphous ester unit is $R_5$ or $R_6$, and provided that when $R_1$ is aromatic, $R_2$ contains from 6 to 12 carbon atoms and the amorphous content is 50–75 percent by weight, the said copolyester having a DTA melting temperature of from about 25° to 150° C., an inherent viscosity of at least 0.5 dl/g at 25° C., as measured in 0.3 g/dl solutions of polymer in chloroform at 25° C., and substantially complete solubility in toluene at 25° C. in the ratio of about 1 percent by weight of copolyester and 90% by weight of solvent;
(b) about 1 to 100 parts by weight of an organic polymer having an average hydroxyl functionality of greater than two available for crosslinking reactions; and
(c) a sufficient amount of an isocyanate crosslinking agent to provide about 0.5 to 4 equivalents of NCO for each equivalent of —OH contained in (a) and (b); said adhesive composition exhibiting delayed tack on heat activation and exhibiting high temperature resistance.

10. A heat activatable thermoplastic adhesive composition in accordance with claim 9, wherein said segmented copolyester comprises adipic acid, the $C_{36}$ dimer acid of linoleic acid, 1,4-cyclohexane dimethanol, and poly(oxytetramethylene) glycol residues.

11. A heat activatable thermoplastic adhesive composition in accordance with claim 9, wherein said organic polymer is hydroxy-substituted polyester.

12. A heat activatable thermoplastic adhesive composition in accordance with claim 9, wherein said organic polymer comprises radicals of diglycidyl ester of bisphenol A and a $C_{36}$ dimer acid of linoleic acid.

13. A heat activatable thermoplasic adhesive composition in accordance with claim 9, wherein said crosslinking agent is a polyisocyanate.

14. A heat activatable thermoplastic adhesive composition in accordance with claim 9, wherein said crosslinking agent is selected from the group consisting of polymethylene polyphenylisocyanate and modified diphenylmethane diisocyanate.

15. A heat activatable thermoplastic adhesive composition in accordance with claim 9, wherein said first part comprises a tackifying resin.

16. A method of bonding, said method comprising:
(a) applying a heat activatable thermoplastic adhesive composition to the surface of a substrate to be bonded,
(b) heating said adhesive composition to a temperature at or above the crystalline melt temperature of said adhesive composition,
(c) allowing said adhesive composition to cool below said crystalline melt temperature,
(d) contacting said adhesive composition with the surface of a second substrate during the open time of said adhesive composition,
(e) maintaining said adhesive composition and said substrates in contact until said adhesive composition has reverted to a non-tacky state,
wherein said adhesive composition comprises the reaction product of:
(a) 100 parts by weight of a thermoplastic polymer;
(b) about 1 to 100 parts by weight of an organic polymer having a plurality of functional groups available for crosslinking reactions; and
(c) a sufficient amount of crosslinking agent capable of effecting the desired degree of crosslinking of said organic polymer;
said adhesive composition exhibiting delayed tack on heat activation and exhibiting high temperature resistance.

17. A method of bonding in accordance with claim 16, wherein said thermoplastic polymer is a polyester and said organic polymer is a hydroxy-substituted polyester.

18. A process for preparing heat activatable thermoplastic adhesive composition, comprising combining:
(a) 100 parts by weight of a thermoplastic segmented copolyester consisting essentially of from about 5 to 75 percent by weight of amorphous ester units and 95 to 25 percent by weight of crystallizable ester units joined through ester linkages, the crystallizable ester units being of the formula:

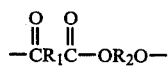

and the amorphous ester units being of the formula:

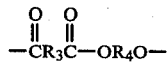

wherein $R_1$ consists of residues of one or more diacids selected from saturated aliphatic dicarboxylic acids containing from 4 to 10 carbon atoms and aromatic dicarboxylic acids selected from terephthalic acid, isophthalic acid, phthalic acid, 4,4'-benzophenone dicarboxylic acid, 4,4'-diphenylmethane dicarboxylic acid, 4,4'-diphenylether dicarboxylic acid, 4,4'-diphenylthioether dicarboxylic acid and 4,4'-diphenylamine dicarboxylic acid, $R_2$ consists of residues of one or more saturated aliphatic diols containing from 2 to 12 carbon atoms, $R_3$ is $R_1$ or $R_5$, $R_4$ is $R_2$ or $R_6$, $R_5$ consists of the divalent radicals containing from about 22 to 50 carbon atoms which remain after removal of the carboxyl groups from saturated aliphatic dimer acids and $R_6$ consists of the divalent radicals remaining after removal of the hydroxyl groups of long chain aliphatic diols having an average molecular weight of 200 to 4000, provided that at least one of $R_3$ and $R_4$ in each amorphous ester unit is $R_5$ or $R_6$, and provided that when $R_1$ is aromatic, $R_2$ contains from 6 to 12 carbon atoms and the amorphous content is 50–75 percent by weight, the said copolyester having a DTA melting temperature of from about 25° to 150° C., an inherent viscosity of at least 0.5 dl/g at 25° C., as measured in 0.3 g/dl solutions of polymer in chloroform at 25° C., and substantially complete solubility in toluene at 25° C. in the ratio of about 10 percent by weight of copolyester and 90% by weight of solvent;

(b) about 1 to 100 parts by weight of a hydroxy-substituted polyester having an average hydroxyl functionality of greater than two available for crosslinking reactions; and (c) a sufficient amount of an isocyanate crosslinking agent to provide about 0.5 to 4 equivalents of NCO for each equivalent of —OH contained in (a) and (b);

said adhesive composition exhibiting delayed tack on heat activation and exhibiting high temperature resistance.

19. A heat activatable composition in accordance with claim 1, wherein said organic polymer and said crosslinking agent are pre-reacted.

20. A heat activatable composition in accordance with claim 5, wherein said organic polymer and said crosslinking agent are pre-reacted.

21. A heat activable composition in accordance with claim 9, wherein said organic polymer and said crosslinking agent are pre-reacted.

* * * * *